(12) United States Patent
Kim et al.

(10) Patent No.: US 12,451,558 B2
(45) Date of Patent: *Oct. 21, 2025

(54) BATTERY PACK

(71) Applicant: Samsung SDI Co., Ltd., Yongin-si (KR)

(72) Inventors: Youngdeok Kim, Yongin-si (KR); Sora Lee, Yongin-si (KR); Eungyeong Gu, Yongin-si (KR); Minkyun Mok, Yongin-si (KR); Janghyun Song, Yongin-si (KR); Soomin Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,689

(22) Filed: Jan. 5, 2024

(65) Prior Publication Data

US 2024/0145847 A1 May 2, 2024

Related U.S. Application Data

(63) Continuation of application No. 16/771,606, filed as application No. PCT/KR2018/014124 on Nov. 16, 2018, now Pat. No. 11,901,576.

(30) Foreign Application Priority Data

Dec. 11, 2017 (KR) .......................... 10-2017-0169536

(51) Int. Cl.
*H01M 50/342* (2021.01)
*H01M 50/209* (2021.01)
(Continued)

(52) U.S. Cl.
CPC ....... *H01M 50/342* (2021.01); *H01M 50/271* (2021.01); *H01M 50/209* (2021.01); *H01M 50/367* (2021.01)

(58) Field of Classification Search
CPC ............. H01M 50/342; H01M 50/271; H01M 50/209; H01M 50/367; H01M 50/3425; H01M 10/0486
See application file for complete search history.

(56) References Cited

U.S. PATENT DOCUMENTS 8,597,808 B2    12/2013  Park et al.
8,802,255 B2 *   8/2014  Cho ..................... H01M 50/119
                                                            429/162
(Continued)

FOREIGN PATENT DOCUMENTS

CN       102468463 A    5/2012
JP       2007-27011 A   2/2007
(Continued)

OTHER PUBLICATIONS

Office action for Korean patent application No. 10-02017-0169536 dated Dec. 19, 2019, 6pp.
(Continued)

*Primary Examiner* — Matthew T Martin
*Assistant Examiner* — Bartholomew A Hornsby
(74) *Attorney, Agent, or Firm* — Womble Bond Dickinson (US) LLP

(57) ABSTRACT

Provided is a battery pack. The battery pack includes: a battery cell including a cell vent; frames arranged together with the battery cell in a direction and coupled together to face each other with the battery cell therebetween, the frames including guide ribs surrounding the cell vent; and a top cover arranged above the frames to cover the frames and including a protruding barrier wall surrounding the guide ribs.

(Continued)

According to the present disclosure, the battery pack has an improved vent structure to rapidly discharge gas generated in an abnormal battery cell to the outside of the battery pack.

16 Claims, 8 Drawing Sheets

(51) Int. Cl.
*H01M 50/271* (2021.01)
*H01M 50/367* (2021.01)

(56) References Cited

U.S. PATENT DOCUMENTS

| | | | |
|---|---|---|---|
| 9,627,663 B2 | 4/2017 | Kim | |
| 2006/0292437 A1* | 12/2006 | Matsumoto | H01M 50/103 |
| | | | 429/82 |
| 2010/0073005 A1* | 3/2010 | Yano | H01M 50/367 |
| | | | 324/427 |
| 2010/0215998 A1 | 8/2010 | Byun et al. | |
| 2011/0097614 A1 | 4/2011 | Kim | |
| 2012/0114993 A1* | 5/2012 | Park | H01M 50/271 |
| | | | 429/88 |
| 2014/0193680 A1 | 7/2014 | Lee et al. | |
| 2014/0234677 A1 | 8/2014 | Yoon et al. | |
| 2015/0214525 A1* | 7/2015 | Lim | H01M 10/0481 |
| | | | 429/53 |
| 2015/0349304 A1 | 12/2015 | Mitsuhashi et al. | |
| 2020/0243823 A1* | 7/2020 | Morita | H01M 50/227 |

FOREIGN PATENT DOCUMENTS

| | | |
|---|---|---|
| JP | 4622019 B2 | 2/2011 |
| JP | 2015-2166 A | 1/2015 |
| JP | 2015-46354 A | 3/2015 |
| JP | 2016-46163 A | 4/2016 |
| KR | 10-0945067 B1 | 3/2010 |
| KR | 10-2011-0044129 A | 4/2011 |
| KR | 10-1191660 B1 | 10/2012 |
| KR | 10-2014-0090077 A | 7/2014 |
| KR | 10-2014-0127743 A | 11/2014 |
| KR | 10-2015-0138036 A | 12/2015 |
| KR | 10-1653305 B1 | 9/2016 |
| KR | 10-1678532 B1 | 11/2016 |
| KR | 10-2017-0054031 A | 5/2017 |

OTHER PUBLICATIONS

Chinese Office Action from corresponding Chinese Patent Application No. 201880078053.1, Chinese Office Action mailed Feb. 22, 2022, with English translation (19 pgs.).

* cited by examiner

BATTERY PACK

CROSS-REFERENCE TO RELATED APPLICATIONS

This application is a continuation of U.S. patent application Ser. No. 16/771,606, filed on Jun. 10, 2020, which is a National Phase Patent Application of International Patent Application Number PCT/KR2018/014124, filed on Nov. 16, 2018, which claims priority of Korean Patent Application No. 10-2017-0169536, filed Dec. 11, 2017. The entire content of each of which is incorporated herein by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs) each including a plurality of cells connected to each other are used according to the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

DESCRIPTION OF EMBODIMENTS

Technical Problem

An embodiment of the present disclosure includes a battery pack having an improved vent structure to rapidly discharge gas generated in an abnormal battery cell to the outside of the battery pack.

Solution to Problem

A battery pack includes:
a battery cell including a cell vent;
frames arranged together with the battery cell in a direction and coupled together to face each other with the battery cell therebetween, the frames including guide ribs surrounding the cell vent; and
a top cover arranged above the frames to cover the frames and including a protruding barrier wall surrounding the guide ribs.

Advantageous Effects of Disclosure

According to the present disclosure, short discharge paths are fluidly connected to the cell vents of battery cells, thereby making it possible to rapidly discharge gas ejected from the cell vents through the short discharge paths, prevent other normal battery cells or circuit devices mounted on a wiring board from be negatively affected by high-temperature gas flowing along a discharge path, and interrupt thermal runway consecutively propagating from an abnormal battery cell to normal battery cells.

According to the present disclosure, tunnel-type discharge paths are connected to the cell vents of battery cells, thereby preventing leakage of high-temperature gas to other battery cells or circuit devices of a wiring board through a discharge path.

According to the present disclosure, a plurality of module vents are provided in fluid connection with the cell vents of battery cells such that gas may be rapidly discharged from the cell vent of an abnormal battery cell through the shortest discharge path regardless of the position of the abnormal battery cell, and safety accidents such as explosions caused by a delay of gas discharge may be prevented.

BEST MODE

Figure 1:
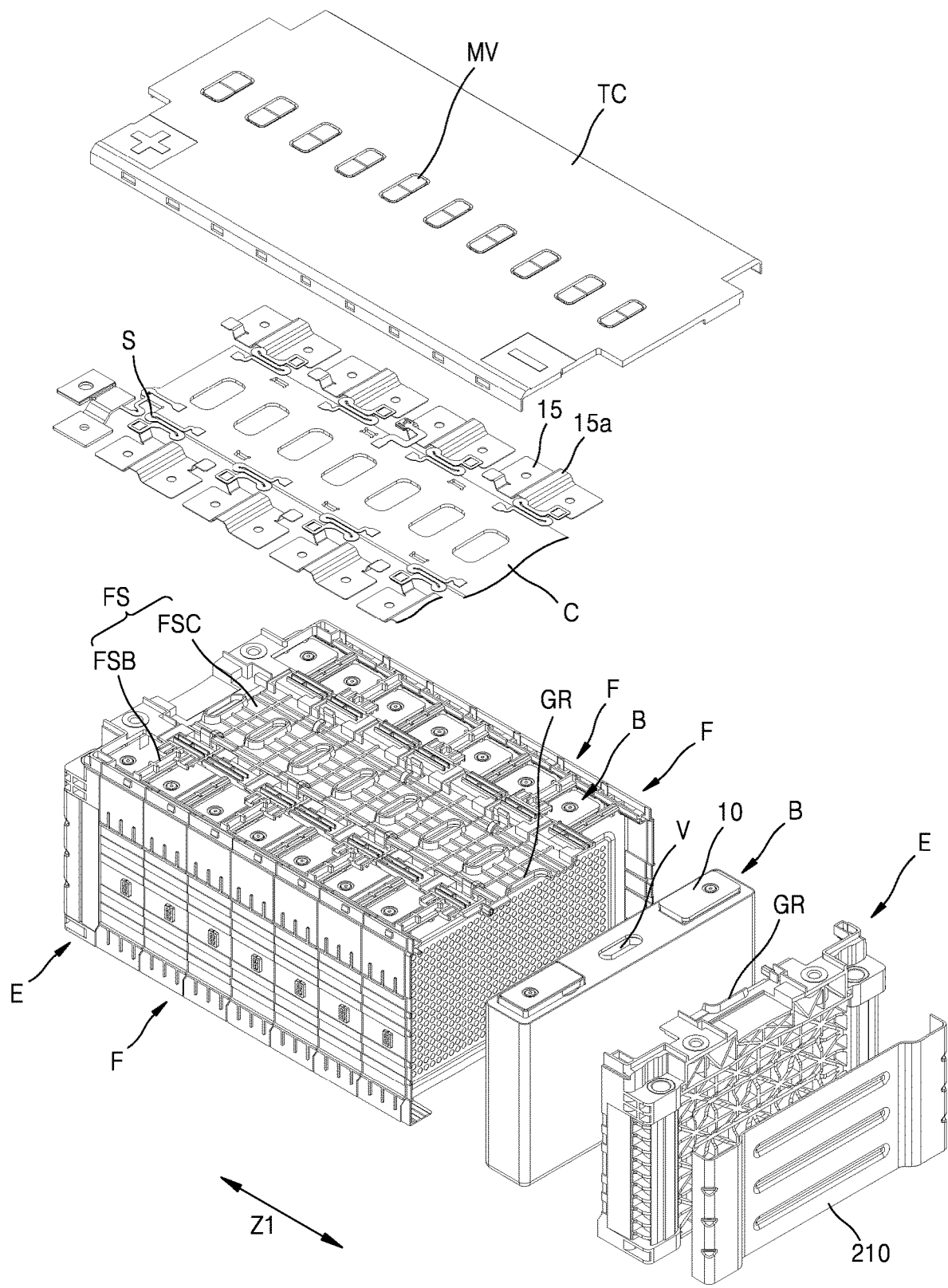
FIG. 1 is an exploded perspective view illustrating a battery pack according to an embodiment of the present disclosure.

A battery pack includes:
a battery cell including a cell vent;
frames arranged together with the battery cell in a direction and coupled together to face each other with the battery cell therebetween, the frames including guide ribs surrounding the cell vent; and
a top cover arranged above the frames to cover the frames and including a protruding barrier wall surrounding the guide ribs.

For example, the guide ribs may form a discharge hole at a position corresponding to the cell vent.

For example, the guide ribs may surround the discharge hole.

For example, the guide ribs may have an elliptical shape corresponding to the cell vent.

For example, as the frames arranged in the direction at front and rear sides of the battery cell with the battery cell therebetween are coupled to each other, the guide ribs may entirely surround the cell vent of the battery cell.

For example, the battery cell may include a plurality of battery cells arranged in the direction, and
a plurality of guide ribs may surround the cell vent of each of the battery cells as frames arranged in the direction with the battery cells therebetween are coupled to each other.

For example, the guide ribs and the protruding barrier wall may protrude in mutually-facing directions from main bodies of the frames and a main body of the top cover.

For example, the guide ribs and the protruding barrier wall form a tunnel-type discharge path.

For example, leading ends of the guide ribs in the protruding direction of the guide ribs may be spaced apart, by a clearance gap, from a leading end of the protruding barrier wall in the protruding direction of the protruding barrier wall.

For example, the leading ends of the guide ribs may be at inner positions relatively close to a center position of the cell vent, and the leading end of the protruding barrier wall may be at an outer position relatively distant from the center position of the cell vent.

For example, when the battery cell swells, the guide ribs provided as a pair surrounding the cell vent of the battery cell may be moved outward away from each other.

For example, the guide ribs may protrude from main bodies of the frames toward the top cover and may be inclined to converge with a width gradually decreasing in a protruding direction of the guide ribs.

For example, the guide ribs may be inclined to have a cross-section gradually decreasing in the protruding direction of the guide ribs.

For example, the protruding barrier wall may protrude from a main body of the top cover toward the frames in a parallel form to have a width which is substantially uniform in a protruding direction of the protruding barrier wall.

For example, a wiring board may be arranged between the top cover and the frames F, and a through-hole may be formed in the wiring board to receive the guide ribs or the protruding barrier wall.

For example, the protruding barrier wall or the guide ribs may be inserted through the through-hole such that the protruding barrier wall or the guide ribs may completely penetrate the wiring board.

For example, a module vent may be formed on the top cover at a position corresponding to the cell vent.

For example, the module vent may include a break line formed by recessing a portion of an upper or lower surface of the top cover in a thickness direction of the top cover.

For example, the break line may include:

a border line formed in a closed loop along a border of the module vent; and a center line formed to cross the border line.

For example, hinge portions may be formed on both lateral portions of the border line which face the center line.

For example, the hinge portions may have a thickness greater than a thickness of the center line.

For example, the module vent may be opened toward both sides of the center line while being broken along the center line and folded at the hinge portions.

For example, the center line may extend in a direction crossing the module vent at a center position of the module vent.

For example, the battery cell may include a plurality of battery cells arranged in the direction, and the module vent may include a plurality of module vents respectively corresponding to the cell vents of the plurality of battery cells.

MODE OF DISCLOSURE

Battery packs will now be described with reference to the accompanying drawings, in which preferable embodiments are shown.

Figure 2:
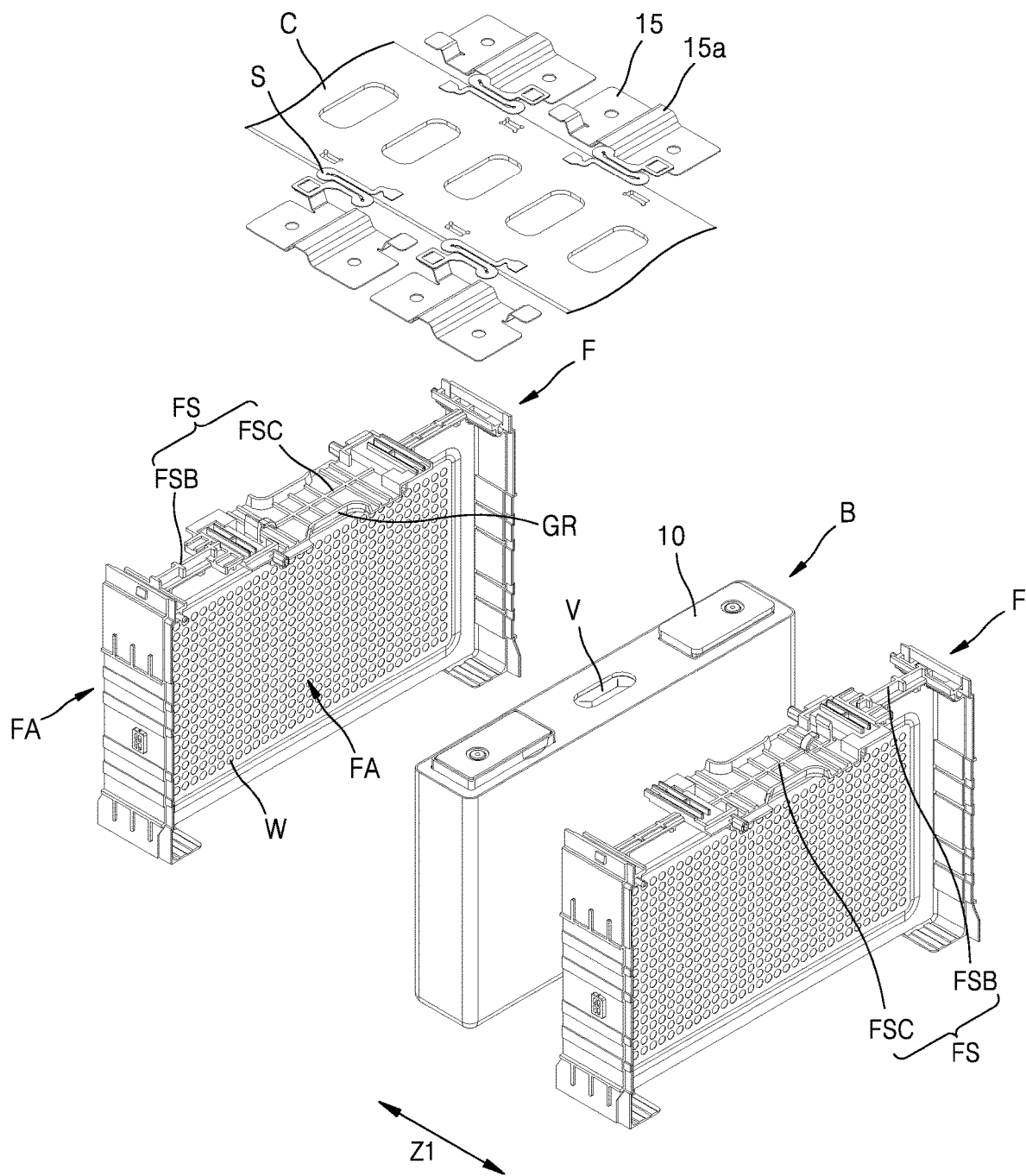
FIG. 2 is an exploded perspective view illustrating a portion of the battery pack shown in FIG. 1.
Figure 3:
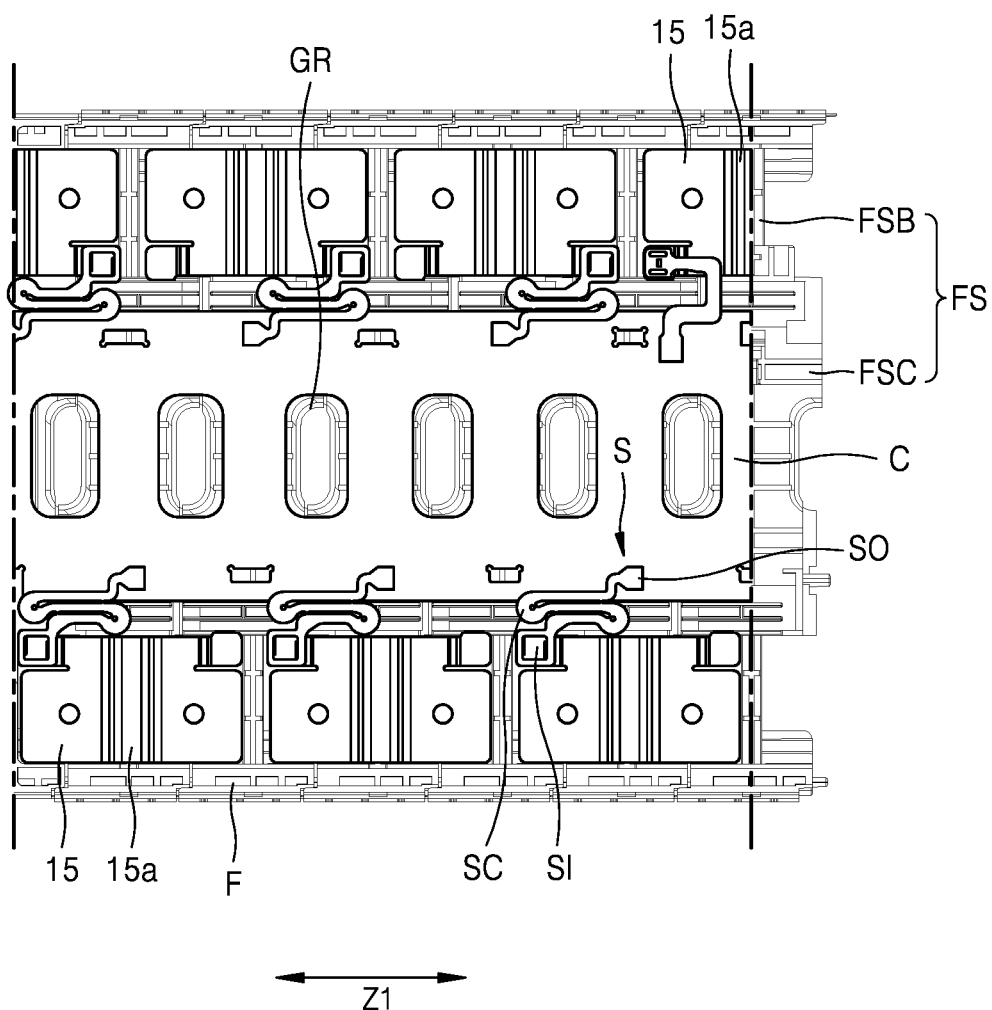
FIG. 3 is a plan view illustrating a portion of the battery pack shown in FIG. 1.

FIG. 1 is an exploded perspective view illustrating a battery pack according to an embodiment of the present disclosure. FIG. 2 is an exploded perspective view illustrating a portion of the battery pack illustrated in FIG. 1. FIG. 3 is a plan view illustrating a portion of the battery pack illustrated in FIG. 1.

Referring to the drawings, the battery pack of the present disclosure includes: battery cells B including cell vents V; frames F arranged together with the battery cells B in a direction (hereinafter, also referred to as a direction Z1) and are coupled to each other to face each other with the battery cells 10 therebetween; and a top cover TC provided above the frames F to cover the frames F. In addition, the frames F may include guide ribs GR surrounding cell vents V of the battery cells B, and the top cover TC may include module vents MV formed at positions corresponding to the cell vents V.

The battery cells B may be arranged in a direction (direction Z1). In addition, the frames F may be arranged together with the battery cells B in the direction (direction Z1) in such a manner that the frames F are coupled to each other with the battery cells B therebetween. The frames F may be arranged in the direction (direction Z1) in such a manner that a battery cell B is placed between every neighboring frames F, and the neighboring frames F are coupled to each other while facing each other.

Each of the frames F may define an accommodation portion FA surrounding the periphery of a battery cell B and extending along the periphery of the battery cell B to accommodate the battery cell B. More specifically, the frame F may extend along the periphery of the battery cell B while crossing upper, lower, and lateral sides of the battery cell B. The frame F may include: the accommodation portion FA as an inner region accommodating the battery cell B: and a support portion FS as an outer region on which objects making electrical connection with the battery cell B such as bus bars 15 and the wiring board C are supported. For example, the support portion FS may be formed on a portion of the frame F which crosses the upper side of the battery cell B on which electrodes 10 are formed. The frame F may have an inner side surrounding the battery cell B and an outer side forming the support portion FS, thereby providing a support base for objects making electrical connection with the battery cell B such as the bus bars 15 and the wiring board C.

The frames F may be arranged in the direction (hereinafter, also referred to as the direction Z1) in such a manner that a battery cell B is placed between every neighboring frames F, and the neighboring frames F are coupled to each other while facing each other. In other words, all the battery cells B are surrounded by the frames F arranged forward and backward in the direction (direction Z1), and the frames F, which are arranged forward and backward, surround the outsides of the battery cells B placed between the frames F such that the frames F may form the exterior of the battery pack covering the battery cells B and may function as a housing protecting the battery cells B. In the battery pack including the battery cells B, the array of the frames F in the direction (direction Z1) may substantially form the exterior of the battery pack, and the battery cells B may be placed inside the array of the frames F and surrounded by the frames F.

The frames F and the battery cells B may be alternately arranged in the direction (direction Z1), and each of the frames F may include different accommodation portions FA accommodating neighboring battery cells B. For example, each of the frames F may include different accommodation portions FA that accommodate different battery cells B arranged forward and backward in the direction (direction Z1), and the different accommodation portions FA may be separated from each other by a barrier wall W. In the frame F, the barrier wall W may be placed between the different accommodation portions FA to separate the accommodation portions FA from each other and may block electrical and thermal interference between the different battery cells B.

Each of the battery cells B may be connected to bus bars 15 for electrical connection with neighboring battery cells B, and the wiring board C may be connected to the battery cells B to obtain state information such as voltage or temperature information about the battery cells B. In this case, the bus bars 15 and the wiring board C may be objects forming electrical connection with the battery cells B, and such objects may be supported on the support portions FS of the frames F.

The support portions FS of the frames F may include bus bar support portions FSB on which bus bars 15 are supported, and board support portions FSC on which the wiring board C is supported. The bus bar support portions FSB and the board support portions FSC may be provided on different positions of the support portions FS. For example, the bus bar support portions FSB may be provided on left or right peripheral portions of the frames F corresponding to the electrodes 10 of the battery cells B. The board support portions FSC may be provided on center portions of the frames F. The wiring board C supported on the board support portions FSC may be at center positions of the battery cells B such that the wiring board C may easily collect state information from a plurality of positions of the battery cells B. Sensing portions S may be connected to the wiring board C to transmit state information from sides of the battery cells B, and since the wiring board C is placed at a center position, the distances between the wiring board C and the sensing portions S connected to the plurality of positions from the wiring board C may be substantially uniform and may be balanced such that the electrical resistances of the sensing portions S connected to the plurality of positions may be balanced to prevent signal distortion.

The bus bar support portions FSB and the board support portions FSC may have different widths. For example, the bus bar support portions FSB may be relatively narrow in order not to interfere electrical connection between the bus bars 15 and the battery cells B (specifically, the electrodes 10 of the battery cells B). The bus bar support portions FSB may support front and back end portions of the bus bars 15 which are placed on both sides of bent portions 15a of the bus bars 15 and may insulate neighboring bus bars 15 from each other. The bus bar support portions FSB may support both end portions of the bus bars 15 and may electrically insulate neighboring bus bars 15 from each other such that both end portions of a bus bar 15 may not make contact with end portions of neighboring bus bars 15. The bus bar support portions FSB do not need to make physical contact with both end portions of the bus bars 15 as long as the bus bar support portions FSB are placed between neighboring bus bars 15 and electrically insulate the neighboring bus bars 15 from each other. Since it is sufficient that the bus bar support portions FSB are placed between the bus bars 15 neighboring each other to prevent electrical contact between the bus bars 15, the bus bar support portions FSB may have a relatively small width so as not to decrease the conduction area between the bus bars 15 and the electrodes 10 of the battery cells B. When the bus bar support portions FSB have a large width like the board support portions FSC, electrical contact between the bus bars 15 and the battery cells B (specifically, the electrodes 10 of the battery cells B) may be hindered, and the conduction area between the bus bars 15 and the battery cells B may be decreased, increasing the electrical resistance of an overall charge-discharge path and decreasing the electrical output power of the battery pack.

The board support portions FSC have a relatively large width such that the wiring board C may be stably placed and supported on the board support portions FSC. The wiring board C may be placed on the board support portion FSC of each of the frames F, and the board support portions FSC of the frames F may be connected to each other in the direction (direction Z1) to form a support surface widely extending in the direction (direction Z1), thereby providing a support base for supporting the wiring board C. That is, while the board support portions FSC of the frames F support the wiring board C, the board support portions FSC of the frames F may be connected to each other in the direction (direction Z1) to form a support surface widely extending in the direction (direction Z1), and thus a support base for stably supporting the wiring board C may be provided.

The bus bars 15 are for electrically connecting the battery cells B neighboring each other, and the bus bars 15 may connect the battery cells B in series, parallel, or series-parallel to each other. The bus bars 15 may electrically connect the neighboring battery cells B to each other by electrically coupling the electrodes 10 of the battery cells B. Specifically, the bus bars 15 may connect the neighboring battery cells B in parallel to each other by connecting electrodes 10 of the battery cells B having the same polarity or in series to each other by connecting electrodes 10 of the battery cells B having different polarities.

The bus bars 15 may be arranged to face the electrodes 10 provided on upper surfaces of the neighboring battery cells B and may electrically connect the electrodes 10 of the neighboring battery cells B to each other. More specifically, based on the bent portions 15a provided at center positions of the bus bars 15, both sides of the bus bars 15 may be pointed toward and coupled to the electrodes 10 of the battery cells B. A plurality of bus bars 15 may connect electrodes 10 of a pair of neighboring battery cells B.

The board support portions FSC may be placed at center positions between the bus bar support portions FSB provided at left and right peripheral portions. The wiring board C may be placed on the board support portions FSC. The wiring board C may include a plurality of conductive patterns (not shown) to collect state information about the battery cells B and transmit the state information to a battery managing unit (not shown). The wiring board C may be electrically connected to the battery cells B, and for example, the wiring board C may be connected to the bus bars 15 used to electrically couple the battery cells B to each other and obtain information about the voltages of the battery cells B. Although not shown in the drawings, the wiring board C may be connected to thermistors (not shown) placed on the upper surfaces of the battery cells B to obtain information about the temperatures of the battery cells B.

The wiring board C may collect state information, for example, voltage and temperature information, from the battery cells B and may transmit the state information to a separate battery managing unit (not shown) such that the separate battery managing unit (not shown) may control charge-discharge operations of the battery cells B, or the charge-discharge operations of the battery cells B may be controlled by a battery managing unit provided together with the wiring board C.

Referring to FIG. 3, the sensing portions S which are flexible may be connected to the wiring board C to as media for transmitting signals relating to battery cell state information. The sensing portions S may be provided in the form of a flexibly deformable film. Although not shown in the drawings, each of the sensing portions S may include an insulative film (not shown) and a conductive line (not shown) provided on the insulative film. For example, the conductive line (not shown) may be a copper foil pattern, and the insulative film (not shown) may be arranged to bury the conductive line (not shown) in the insulative film (not shown) such that electrical signals transmitted through the conductive line (not shown) may be insulated from the outside.

Each of the sensing portions S may include an input port SI connected to a side of a battery cell B, an output port SO connected to the wiring board C, and a connection portion SC connecting the input port SI and the output port SO to each other. For example, the input port SI may correspond to a portion receiving state information from the side of the battery cell B, and the output port SO may correspond to a portion through which the state information about the battery cell B is output to the wiring board C.

More specifically, the input ports SI of the sensing portions S may be connected to sides of the battery cells B. The input ports SI of the sensing portions S may be connected to the bus bars 15 electrically connecting the battery cells B neighboring each other and may receive voltage signals of the battery cells B through the bus bars 15. Although not shown in the drawings, according to another embodiment of the present disclosure, the input ports SI may be connected to the thermistors (not shown) placed on the upper surfaces of the battery cells B and may receive temperature signals of the battery cells B from the thermistors (not shown). In this view, the input ports SI of the sensing portions S may be considered as being connected to signal input portions for acquiring state information about the battery cells B. The signal input portions may be connected to the battery cells B for acquiring state information such as the voltages or temperatures of the battery cells B and may be, for example, the bus bars 15 electrically connected to the battery cells B or the thermistors (not shown) thermally connected to the battery cells B. The input ports SI may be welded to the signal input portions (for example, the bus bars 15) provided on the sides of the battery cells B. For example, the input ports SI may be welded to the bus bars 15 using ultrasonic waves by placing the input ports SI on the bus bars 15 and then pressing the input ports SI with an ultrasonic horn (not shown) applying ultrasonic vibration thereto. In another embodiment of the present disclosure, the input ports SI and the signal input portions (for example, the bus bars 15) provided on the sides of the battery cells B may be coupled to each other using a conductive adhesive or the like.

The output ports SO of the sensing portions S may be connected to pads (not shown) of the wiring board C, and electrical signals transmitted through the output ports SO of the sensing portions S may arrive at the conductive patterns (not shown) of the wiring board C via the pads (not shown) of the wiring board C. The output ports SO of the sensing portions S may be welded or soldered to the pads (not shown) of the wiring board C or may be coupled to the pads of the wiring board C using a conductive adhesive or the like.

Each of the connection portions SC, which connects the input port SI and the output port SO to each other, may be formed in a curved shape in which curved portions overlap each other. The battery pack may include the frames F facing each other and coupled to each other with the battery cells B therebetween in the direction (direction Z1) in which the battery cells B are arranged. During the charge-discharge operations of the battery cells B, the battery cells B may undergo swelling, that is, expansion, in the direction (direction Z1), and in this case, the frames F which are forwardly and backwardly coupled to each other with the battery cells B therebetween in the direction (direction Z1), may slide in the direction (direction Z1) and accommodate deformation caused by the swelling of the battery cell B.

As described above, when the battery cells B swell and expand in the direction (hereinafter, also referred to as the direction Z1), the frames F may move in the direction (direction Z1), and thus the relative positions of the input ports SI coupled to the bus bars 15 placed on the frames F and the output ports SO coupled to the wiring board C may become farther from each other in the direction (direction Z1). In this case, the connection portions SC connecting the input ports SI and the output ports SO may deform to accommodate the deformation in the direction (direction Z1). In this case, since the connection portions SC have a curved shape in which curved portions overlap each other, the connection portions SC may be easily deformed according to the relative positions of the input ports SI and the output ports SO which are moved away from each other because of the swelling, and thus less stress may be accumulated in the connection portions SC.

In FIG. 1, reference numerals E and 210 refer to end blocks and end plates, respectively. The end blocks E and the end plates 210 may be placed on the outer sides of the outermost battery cells B to provide fastening force for physically restraining the battery cells B of the battery pack.

Figure 4:
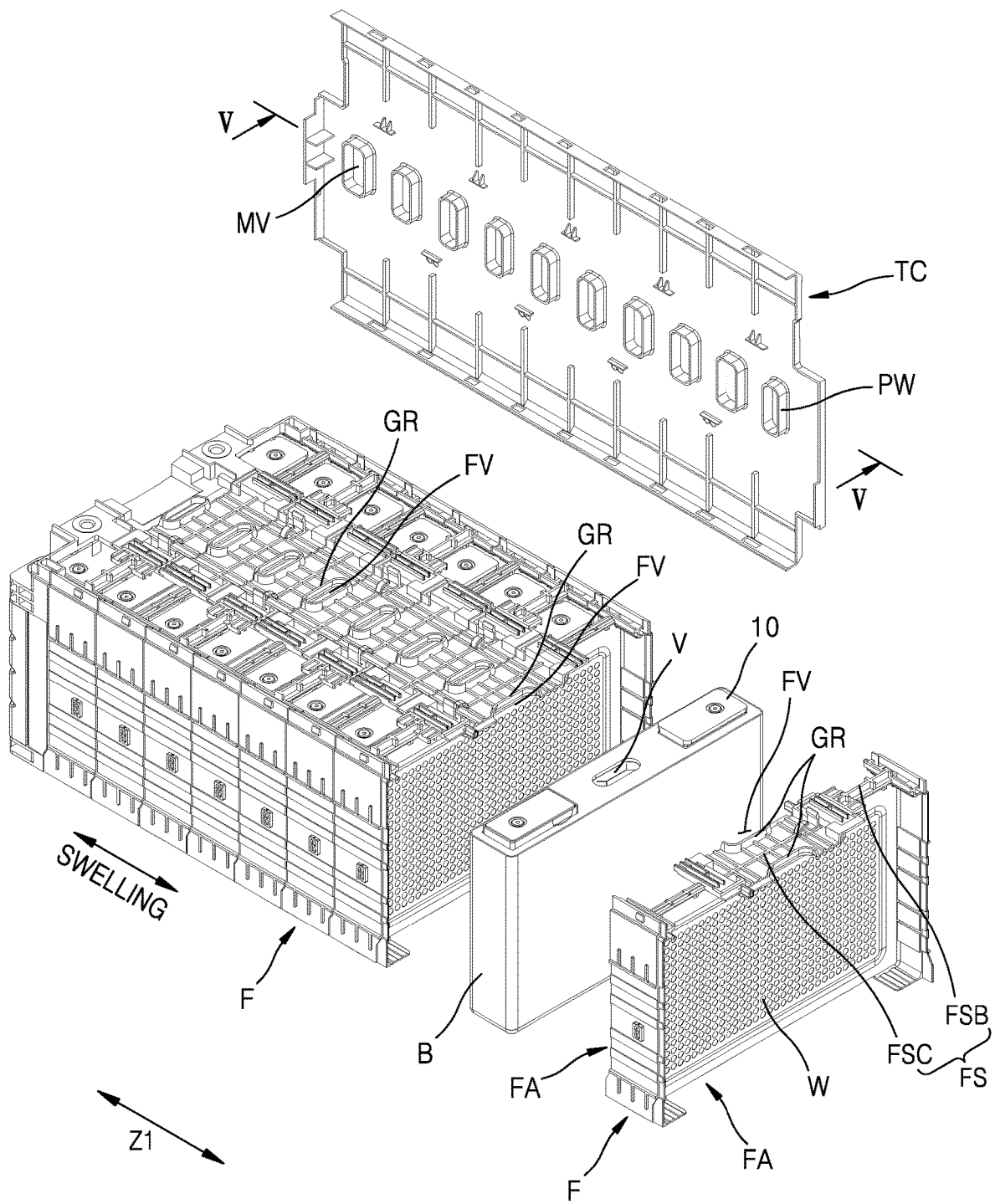
FIG. 4 is an exploded perspective view illustrating a portion of the battery pack shown in FIG. 1.
Figure 5:
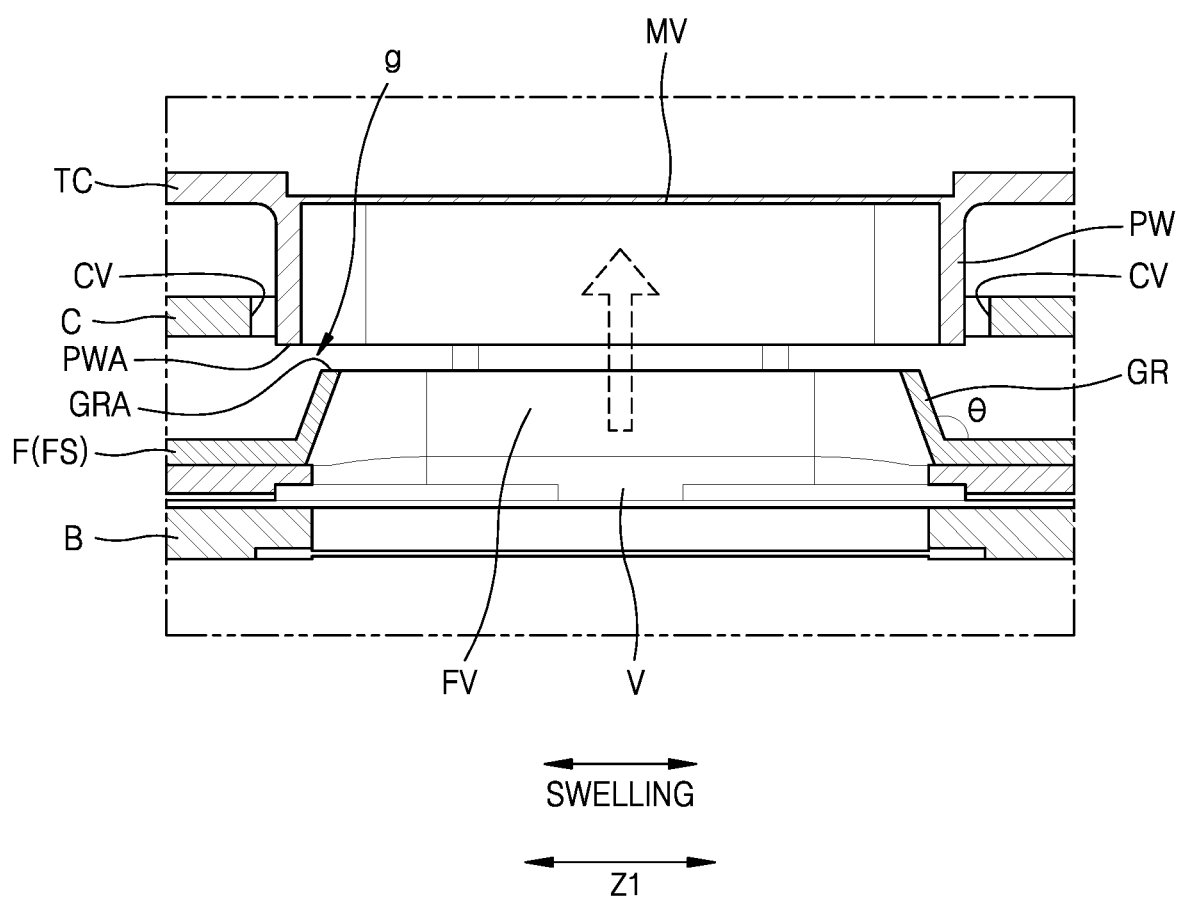
FIG. 5 is a cross-sectional view taken along line V-V of FIG. 4.

FIG. 4 is an exploded perspective view illustrating a portion of the battery pack illustrated in FIG. 1. FIG. 5 is a cross-sectional view taken along line V-V of FIG. 4.

Referring to the drawings, the battery pack of the present disclosure includes: the battery cells B including the cell vents V; and the frames F arranged together with the battery cells B in the direction (direction Z1) and are coupled to each other to face each other with the battery cells 10 therebetween, wherein the frames F may include guide ribs GR formed to surround the cell vents V.

More specifically, the guide ribs GR may be provided on the frames F to form discharge holes FV at positions corresponding to the cell vents V of the battery cells B. For example, the guide ribs GR may be formed on the frames F which cross the upper sides of the battery cells B in which the cell vents V are formed. For example, the guide ribs GR may be formed on the support portions FS (specifically, the board support portions FSC) of the frames F that cross the upper sides of the battery cells B, and the guide ribs GR may be at positions corresponding to the cell vents V of the battery cells B.

The discharge holes FV may be formed at positions corresponding to the cell vents V of the battery cells B, and the guide ribs GR may form the discharge holes FV while being arranged along the peripheries of the discharge holes FV to surround the discharge holes FV. The guide ribs GR may be fluidly connected to the cell vents V of the battery cells B to provide discharge paths for gas discharged through the cell vents V, and may thus be formed at positions corresponding to the cell vents V and have a shape corresponding to the shape of the cell vents V. For example, the guide ribs GR may be formed in an elliptical shape corresponding to the cell vents V, and the discharge holes FV formed by the guide ribs GR may also have an elliptical shape corresponding to the cell vents V.

The guide ribs GR may formed at positions corresponding to the cell vents V of the battery cells B and may protrude in a direction opposite the cell vents V. The guide ribs GR may protrude opposite the cell vents V in a gas discharge direction to form the discharge paths for gas discharged through the cell vents V. For example, the guide ribs GR may protrude from main bodies (or the support portions FS) of the frames F in a direction opposite the cell vents V.

The guide ribs GR may surround the cell vents V of the battery cells B. Here, since the frames F are at upper positions of the battery cells B, it can be understood that the guide ribs GR formed on the frames F surround upper sides of the cell vents V of the battery cells B rather than directly surrounding the cell vents V of the battery cells B. For example, the guide ribs GR may surround the discharge holes FV formed above the cell vents V.

The expression "the guide ribs GR are formed to surround the cell vents V of the battery cells B" refers to the case in which a guide rib GR formed on each of the frames F surrounds a portion of a cell vent V as well as the in the case in which a guide rib GR formed on each of the frames F entirely surrounds a cell vent V. For example, each of the guide ribs GR may be formed in an open shape to surround a portion of a cell vent, a pair of guide ribs GR provided on front and rear frames F coupled together to face each other with a battery cell B therebetween may be coupled to each other to entirely surround the cell vent V of the battery cell B, and thus a discharge hole FV having an elliptical shape corresponding to the cell vent V of the battery cell B may be provided by the pair of guide ribs GR.

Similarly, the expression "the guide ribs GR and the discharge holes FV are formed in an elliptical shape corresponding to the cell vents of the battery cells B" may refer to the case in which a guide rib GR and a discharge hole FV formed on each of the frames F is shaped like a portion of an ellipse as well as the case in which a guide rib GR and a discharge hole FV formed on each of the frames F has a complete elliptical shape. For example, each of the guide ribs GR and each of the discharge holes FV may be formed in a shape having an open side, and as a pair of guide ribs GR provided on front and rear frames F coupled together to face each other with a battery cell B therebetween are coupled to each other, the pair of guide ribs GR may have an complete elliptical shape, and a discharge hole FV having an complete elliptical shape may be provided.

The frames F and the battery cells B may be alternately arranged in the direction (direction Z1), and each of the frames F may include different accommodation portions FA to accommodate neighboring battery cells B. In addition, the guide ribs GR protruding from the main bodies of the frames F, and the discharge holes FV formed by the guide ribs GR may correspond to the cell vents V of the battery cells B neighboring each other and may be provided as pairs above the cell vents V of the battery cells B. In this case, the guide ribs GR protruding from the main bodies of the frames F, and the discharge holes FV formed by the guide ribs GR may be at positions corresponding to the cell vents V which are separated by the partition walls W each separating the accommodation portions FA of a frame from each other.

Referring to FIG. 5, the guide ribs GR may be formed in a shape having a relatively wide lower side and a relatively narrow upper side in a vertical direction along the discharge paths. That is, the guide ribs GR are inclined in a converging manner to have a cross-sectional shape gradually decreasing in an upward direction from the discharge holes FV, such that the flows of gas guided by the guide ribs GR may converge at center positions of the guide ribs GR and the pressure of gas may be concentrated at the center positions of the guide ribs GR. Since the cross sections of the guide ribs GR refer to cross-sectional areas through which gas passes, the gradually decreasing cross-sectional shape of the guide ribs GR may increase the pressure of gas and concentrate the flows of gas at the center positions of the guide ribs GR.

The guide ribs GR may protrude in a direction opposite the battery cells B from the support portions FS of the frames F that cross the upper sides of the battery cells B in which the cell vents V are formed, and may make a constant oblique angle $\theta$ with the support portions FS of the frames F. More specifically, the oblique angle $\theta$ of the guide ribs GR may be greater than 90 degrees with respect to the support portions FS of the frames F such that the cross-sectional shape of the guide ribs GR may be gradually tapered in an upward direction. That is, the oblique angle $\theta$ of the guide ribs GR from the support portions FS of the frames F may be set to be within the range of 90 degrees<$\theta$<180 degrees. The oblique angle $\theta$ of the guide ribs GR may be set such that the guide ribs GR may have a left-right symmetrical structure and may converge toward the center positions of the guide ribs GR. For example, the guide ribs GR may surround the discharge holes FV, have an elliptical shape like the discharge holes FV, and protrude in a direction opposite the battery cells B.

Each pair of the guide ribs GR may be formed by coupling a pair of frames F arranged back and forth with a battery cell B therebetween in the direction (direction Z1). For example, front and rear frames F may be coupled together to face each other with a battery cell B therebetween such that a guide rib GR of the front frame F and a guide rib GR of the rear frame F may be coupled to each other at a position corresponding to the cell vent V of the battery cell B to entirely surround the cell vent V of the battery cell B. The frames F may be arranged in the direction (direction Z1) and may be coupled together with the battery cells B therebetween such that pairs of the guide ribs GR may be provided at positions corresponding to the cell vents V of the battery cells B to surround the cell vents V. The guide ribs GR may be formed to surround the cell vents V of the battery cells B and may provide the discharge paths for gas discharged through the cell vents V. The gas discharged through the cell vents V may flow through the discharge holes FV and may then be discharged through the top cover TC provided above the discharge holes FV while being guided by the guide ribs GR.

Like the guide ribs GR, each pair of discharge holes FV may be formed by coupling a pair of frames F arranged back and forth with a battery cell B therebetween in the direction (direction Z1). For example, front and rear frames F may be coupled together to face each other with a battery cell B therebetween such that a discharge hole FV of the front frame F and a discharge hole FV of the rear frame F may be coupled to each other at a position corresponding to the cell vent V of the battery cell B to form a complete elliptical shape. That is, the frames F may be arranged in the direction (direction Z1) and may be coupled together with the battery cells B therebetween such that the discharge holes FV may be provided at positions corresponding to the cell vents V of the battery cells B and the guide ribs GR surrounding the discharge holes FV may be provided.

The guide ribs GR and the discharge holes FV may be formed at positions corresponding to the cell vents V of the battery cells B. The guide ribs GR and the discharge holes FV may be provided at positions corresponding to the cell vents V of the battery cells B as the frames arranged on the front and rear sides of the battery cells B in the direction (direction Z1) are coupled to each other. For example, as a pair of frames F arranged on the front and rear sides of a battery cell B are coupled to each other, a guide rib GR and a discharge hole FV of the front frame F may be coupled to a guide rib GR and a discharge hole FV of the rear frame F such that the guide ribs GR and the discharge holes FV may be provided at a position corresponding to the cell vent V of the battery cell B to entirely surround the cell vent V of the battery cell B.

The guide ribs GR and the discharge holes FV may be formed at positions corresponding to the cell vents V of the battery cells B. That is, the guide ribs GR and the discharge holes FV may be formed at positions corresponding to the cell vents V of the battery cells B along the arrangement of the frames F connected to each other with the battery cells B therebetween.

When one of the battery cells B is locally overheated and the cell vent V of the battery cell B is operated, gas is discharged through the cell vent V and is guided to the top cover TC along guide ribs GR surrounding the cell vent V while not leaking to other battery cells B owing to the guide ribs GR. When high-temperature gas discharged from one of the battery cells B flows to adjacent battery cells B, thermal runaway may consecutively occur at the adjacent battery cells B, and to prevent this, the guide ribs GR define the discharge paths such that gas discharged from one of the battery cells B does not flow to other battery cells B.

In the present disclosure, since the discharge holes FV and the guide ribs GR are formed corresponding to the cell vents V of the battery cells B, gas discharged from one of the battery cells B may not flow to other battery cells B but may be discharged to the outside of the battery pack through a short discharge path. That is, in the present disclosure, the discharge paths are not formed in the direction (hereinafter, also referred as the direction Z1) in which the battery cells B are arranged, but are formed as short paths in a vertical direction perpendicular to the direction (direction Z1). In a comparative example for comparison with the present disclosure, gas discharged from one of the battery cells B is discharged to the outside of the battery pack along a discharge path extending in the direction (direction Z1) in which the battery cells B are arranged. In the discharge path, the gas discharged from one of the battery cells B flows across other battery cells B arranged in the direction (direction Z1), and thus thermal runaway may occur at the other battery cells B.

Gas discharged from the cell vent V of a battery cell B may be guided to the top cover TC along guide ribs GR surrounding the cell vent V of the battery cell B. The top cover TC may have protruding barrier walls PW which protrude toward the cell vents V of the battery cells B. For example, the protruding barrier walls PW may protrude toward the cell vents V from a main body of the top cover TC.

The protruding barrier walls PW may protrude from the main body of the top cover TC toward the frames F while vertically extending in parallel with each other to have a substantially uniform width in the protruding direction. The protruding barrier walls PW may be fluidly connected to the guide ribs GR of the frames F such that discharge paths may be provided as tunnel-type discharge paths. The guide ribs GR has the oblique angle θ to converge inward toward the centers of the cell vents V, and the protruding barrier walls PW may have relatively wide cross-sections for fluid connection with the guide ribs GR without leakage. The protruding barrier walls PW may vertically extend in parallel with each other such that the protruding barrier walls PW may have a relatively wide uniform width.

The protruding barrier walls PW may be formed to surround the cell vents V. Here, since the top cover TC is above the battery cells B, it may be understood that the protruding barrier walls PW surround upper sides of the cell vents V of the battery cells B rather than the protruding barrier walls PW directly surrounding the cell vents V of the battery cell B.

The protruding barrier walls PW may be formed to surround the guide ribs GR. As described above, the protruding barrier walls PW may has a relatively wide width for fluid connection with the guide ribs GR without leakage such that the protruding barrier walls PW having a relatively wide width may surround the outer sides of the guide ribs GR.

The protruding barrier walls PW protruding from the main body of the top cover TC toward the cell vents V are fluidly connected to the guide ribs GR protruding from the main bodies of the frames F in a direction opposite to the cell vents V. That is, the protruding barrier walls PW and the guide ribs GR which protrude in mutually-facing directions may be fluidly connected to each other to provide the discharge paths as tunnel-type discharge paths. High-temperature gas discharged from the cell vent V of a battery cell B is guided toward a module vent MV of the top cover TC via guide ribs GR and a protruding barrier wall PW provided above the cell vent V without leakage between the top cover TC and the frames F to adjacent battery cells B.

The guide ribs GR and the protruding barrier walls PW protrude to face each other to form the discharge paths between the top cover TC and the frames F, and owing to the combination of the guide ribs GR and the protruding barrier walls PW, gas discharged through the cell vents V may vertically flow through the discharge paths without leakage. When gas discharged from the cell vent V of any one of the battery cells B leaks from the discharge path defined by the guide ribs GR and the protruding barrier wall PW to an adjacent space between the top cover TC and the frames F, adjacent battery cells B or circuit devices (not shown) of the wiring board C may thermally deteriorate.

The guide ribs GR and the protruding barrier walls PW protrude in mutually-facing directions from the frames F and the top cover TC at positions corresponding to the cell vents V of the battery cells such that the tunnel-type discharge paths fluidly connected to the cell vents V may be formed between the top cover TC and the frames F. The guide ribs GR and the protruding barrier walls PW are formed to surround the cell vents V such that gas discharged from the cell vent V of a battery cell B may not leak from the tunnel-type discharge paths surrounded by the guide ribs GR and the protruding barrier walls PW and may be rapidly discharged to the outside of the battery pack through the tunnel-type discharge path providing the shortest path without having a negative effect on the circuit devices (not shown) of the wiring board C or other battery cells B adjacent to the cell vent V of the battery cell B.

As described above, although the guide ribs GR and the protruding barrier walls PW provide, in combination, the tunnel-type discharge paths, the guide ribs GR may not be in contact with the protruding barrier walls PW but may be spaced apart from the protruding barrier walls PW by clearance gaps (g). The guide ribs GR formed on the frames F may entirely surround the cell vents V as the frames F arranged forward and backward with the battery cells B therebetween in the direction (direction Z1) are coupled to each other. In this case, the frames F arranged forward and backward and coupled to each other in the direction (hereinafter, also referred to as the direction Z1) may be moved away from each other in the direction (direction Z1) when the battery cells B swell. In this case, when a battery cell B swells, a pair of guide ribs GR coupled to each other to entirely surround the cell vent V of the battery cell B may be moved outward away from each other, and thus the pair of guide ribs GR may be away from the protruding barrier wall PW. The swelling of each of the battery cells B causes a pair of frames F coupled together with the battery cell B therebetween to move away from each other (outward directions) but does not affect the top cover TC arranged above the battery cells B, such that the positions of the protruding barrier walls PW formed on the top cover TC may not be varied and the positions of the guide ribs GR formed on the frames F may be varied. For this reason, the guide ribs GR are formed at inner positions relatively close to the centers of the cell vents V, and the protruding barrier walls PW are formed at outer positions relatively distant from the centers of the cell vents V with predetermined clearance gaps (g) between the protruding barrier walls PW and the guide ribs GR such that the guide ribs GR may not be moved outside the protruding barrier walls PW when each pair of guide ribs GR connected to each other to entirely surround a cell vent V are moved outward away from each other. That is, based on the centers of the cell vents V, the guide ribs GR are formed at inner positions relatively close to the centers of the cell vents V, the protruding barrier walls PW are formed at outer positions relatively distant from the centers of the cell vents V, and predetermined gaps (g) are formed between the guide ribs GR formed at the inner positions and the protruding barrier walls PW formed at the outer positions such that the guide ribs GR may not be moved outside the protruding barrier walls PW even when the guide ribs GR are moved outward because of the swelling of the battery cells B. Here, in the expression "the guide ribs GR are arrange at inner positions and the protruding barrier walls PW are arranged at outer positions," the inner positions and the outer positions may refer to the positions of leading ends GRA and PWA of the guide ribs GR and the protruding barrier walls PW which face each other. When the guide ribs GR and the protruding barrier walls PW provide the tunnel-type discharge paths, mutually-facing portions of the guide ribs GR and the protruding barrier walls PW, that is, the leading ends GRA of the guide ribs GR and the leading ends of the protruding barrier walls PW at which the guide ribs GR and the protruding barrier walls PW are fluidly connected to each other, may mismatch each other and thus gas may leak between the guide ribs GR and the protruding barrier walls PW. That is, the leading ends GRA of the guide ribs GR in the protruding direction of the guide ribs GR and the leading ends PWA of the protruding barrier walls PW in the protruding direction of the protruding barrier walls PW may be spaced apart from each other with the predetermined clearance gaps (g) therebetween, and the leading ends GRA of the guide ribs GR may be inside the leading ends PWA of the protruding barrier walls PW.

In this way, the predetermined clearance gaps (g) are formed between the guide ribs GR and the protruding barrier walls PW, which arranged at inner positions and outer positions based on the centers of the cell vents V. Although the clearance gaps (g) are provided between the guide ribs GR and the protruding barrier walls PW, gas discharged through the cell vents V may not leak through the clearance gaps (g) while flowing along the tunnel-type discharge paths. Since the guide ribs GR have the oblique angle θ and converge inward toward the centers of the cell vents V, gas discharged from the cell vents V may be concentrated toward the centers of the cell vents V while being guided by the guide ribs GR, and thus the gas discharged from the cell vents V may not leak from the tunnel-type paths to a neighboring space through the clearance gaps (g) formed outside the guide ribs GR.

Preferably, the clearance gaps (g) may designed such that even when the guide ribs GR are moved outward in response to the swelling of the battery cells B, the guide ribs GR may not be moved outside the protruding barrier walls PW. More specifically, the clearance gaps (g) may be designed by considering the swelling of the battery cells B such that even when a pair of guide ribs GR connected to each other to entirely surround a cell vent V are maximally moved outward, the guide ribs GR may not be moved outside the protruding barrier wall PW, for example, the leading ends GRA of the guide ribs GR and the leading end PWA of the protruding barrier wall PW may just face each other at the same positions. In this case, each pair of guide ribs GR connected to each other at front and rear positions with a battery cell B therebetween may be moved away from each other in response to the swelling of the battery cell B by a distance corresponding to the degree of swelling of the battery cell B, and thus the clearance gaps (g) may be set to correspond to the maximal degree of swelling of the battery cells B.

As described above, the guide ribs GR and the protruding barrier walls PW may be formed to be spaced apart from each other with the predetermined clearance gaps (g) therebetween. In this case, the guide ribs GR and the protruding barrier walls PW may be respectively formed at inner positions relatively close to the center positions of the cell vents V and outer positions relatively distant from the center positions of the cell vents V with the predetermined clearance gaps (g) being between the guide ribs GR and the protruding barrier walls PW. In addition, the guide ribs GR and the protruding barrier walls PW may be spaced apart from each other in a vertical direction. The guide ribs GR and the protruding barrier walls PW may be spaced apart from each other by a predetermined clearance by considering assembly tolerance among the frames F on which the guide ribs GR are formed, the top cover TC on which the protruding barrier walls PW are formed, and the wiring board C between the frames F and the top cover TC.

The guide ribs GR and the protruding barrier walls PW may protrude in mutually-facing directions from the main bodies of the frames F (or the support portions FS of the frames F) and the main body of the top cover TC, and may form, in combination, the tunnel-type discharge paths between the main bodies of the frames F (or the support portions FS of the frames F) and the main body of the top cover TC.

Figure 6:
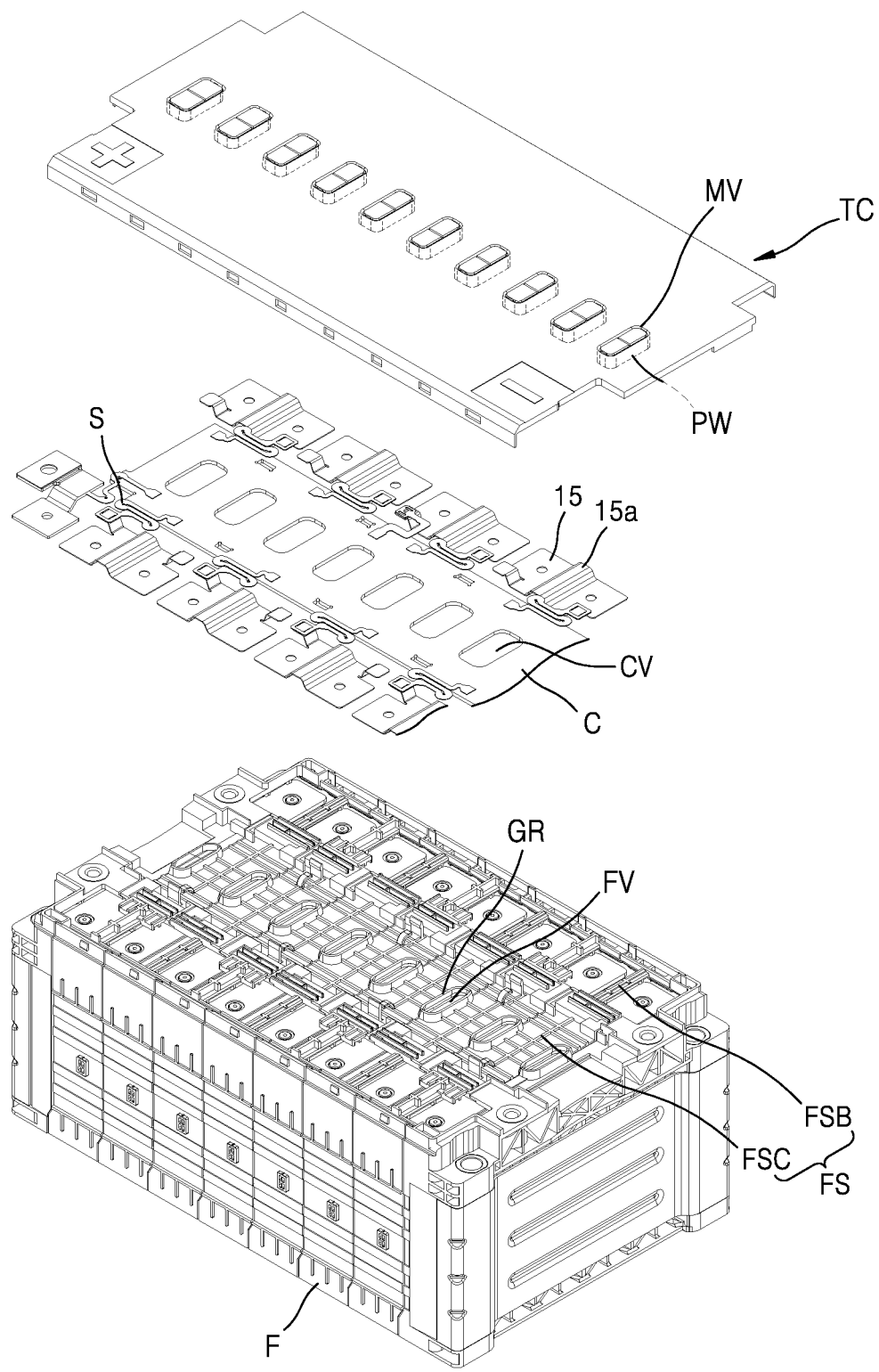
FIG. 6 is another exploded perspective view illustrating the battery pack shown in FIG. 1.

FIG. 6 is another exploded perspective view illustrating the battery pack shown in FIG. 1.

Referring to the drawing, the wiring board C may be arranged between the frames F and the top cover TC. The wiring board C collects state information of the battery cells B such as the voltages or temperatures of the battery cells B, and transmits the state information to a separate battery management unit (not shown) or controls the charge-discharge operations of the battery cells B based on the collected state information. To this end, a plurality of circuit devices (not shown) may be mounted on upper and lower surfaces of the wiring board C.

Through-holes CV may be formed in the wiring board C so as not to obstruct the tunnel-type discharge paths provided by the guide ribs GR and the protruding barrier walls PW. More specifically, the protruding barrier walls PW or the guide rib GR may extend and be assembled through the through-holes CV of the wiring board C, and the tunnel-type discharge paths provided by the guide ribs GR and the protruding barrier walls PW may penetrate the wiring board C through the through-holes CV. For example, the protrusion barrier walls PW may protrude from the main body of the top cover TC and may penetrate the wiring board C as being fitted into the through-holes CV. In another embodiment of the present disclosure, the guide ribs GR may protrude from the main bodies of the frames F (or the support portions FS of the frames F) and may penetrate the wiring board C as being fitted into the through-holes CV. As described above, the tunnel-type discharge paths provided by the guide ribs GR and the protruding barrier walls PW which protrude to face each other may extend through the through-holes CV of the wiring board C without being obstructed, and thus gas discharged from the cell vents V may not permeate into the wiring board C, thereby fundamentally preventing deterioration of the circuit elements (not shown) mounted on the wiring board C. For example, since the protruding barrier walls PW or the guide ribs GR penetrate the wiring board C as being inserted into the through-holes CV, the tunnel-type discharge paths provided by the protruding barrier walls PW and the guide ribs GR may not be open to the wiring board C or the circuit elements (not shown) of the wiring board C.

Preferably, the protruding barrier walls PW or the guide ribs GR may be inserted through the through-holes CV of the wiring board C such that the protruding barrier walls PW or the guide ribs GR may completely penetrate the wiring board C. Since there is a risk of gas leakage at the leading ends PWA and GRA (refer to FIG. 5) at which the protruding barrier walls PW and the guide rib GR are connected to each other, when the protruding barrier walls PW and the guide ribs GR are connected to each other inside the through-holes CV, that is, when the leading ends PWA (refer to FIG. 5) of the protruding barrier walls PW and the leading ends GRA (refer to FIG. 5) of the guide ribs GR are located to face each other inside the through-holes CV, the wiring board C and the circuit elements (not shown) of the wiring board C may deteriorate due to gas leakage.

The module vents MV may be formed on the top cover TC. The module vents MV may be formed at positions corresponding to the cell vents V of the battery cells B. More specifically, the module vents MV may be formed at positions corresponding to the protrusion barrier walls PW of the top cover TC. Since the protrusion barrier walls PW of the top cover TC provides the discharge paths, gas flowing through the discharge paths may be guided to the module vents MV by the protrusion barrier walls PW.

Figure 7:
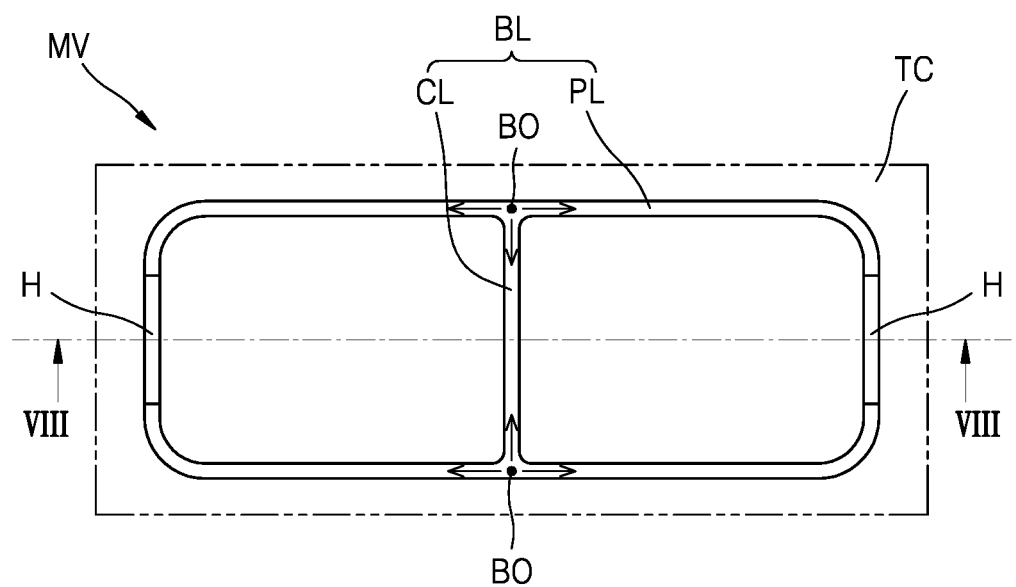
FIG. 7 is a view illustrating a module vent shown in FIG. 6.
Figure 8:
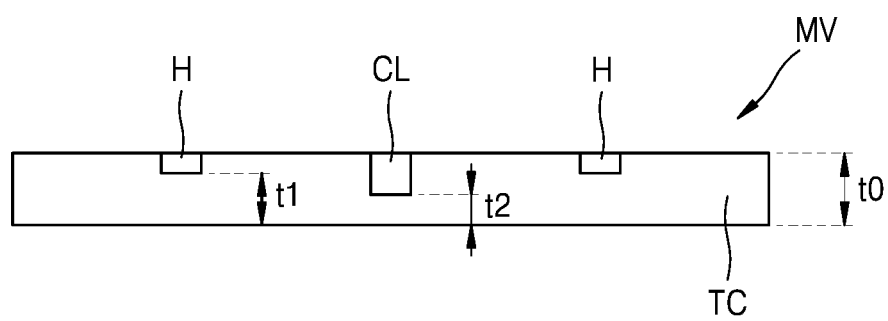
FIG. 8 is a cross-sectional view taken along line VIII-VIII of FIG. 7.

FIG. 7 is a view illustrating a module vent shown in FIG. 6. FIG. 8 is a cross-sectional view taken along line VIII-VIII of FIG. 7.

Referring to the drawings, each of the module vents MV may be formed by a break line BL which is formed by recessing a portion of the top cover TC corresponding to a cell vent V to a predetermined depth. The module vent MV may be formed by a break line BL engraved to a predetermined depth without using an additional member such as tape, and a groove may be formed in the upper or lower surface of the top cover TC by recessing a portion of the upper or lower surface of the top cover TC in the depth direction thereof to form the break line BL. Since the module vent MV is formed by the break line BL which is a groove having a predetermined depth in the top cover TC, an additional assembly process for attaching an additional member such as tape to the top cover TC is not necessary.

Each module vent MV may be formed in a closed loop surrounding the cell vent V of a battery cell B. For example, the break line BL forming the module vent MV may include a border line PL formed in a closed loop to define the module vent MV, and a center line CL crossing the border line PL.

The center line CL may be formed at a center position of the module vent MV in a direction crossing the module vent MV. The center line CL may be rapidly broken by the pressure of gas which is concentrated at the center position under the guidance of the guide ribs GR inclined to converge toward the center position.

For example, hinge portions H may be formed on portions of the border line PL such that the module vent MV may be opened at both sides of the center line CL. The hinge portions H may be formed on both lateral portions of the border line PL which face the center line CL, and the hinge portions H may have a relatively thick thickness such that when the module vent MV is broken, the module vent MV may not be separated from the top cover TC but may maintain connection with the top cover TC through the hinge portions H. When the module vent MV is operated in response to the pressure of gas discharged from the cell vent V, the module vent MV is broken along the center line CL into two parts while maintaining connection with the top cover TC through the hinge portions H facing the center line CL without being separated and scattered from the top cover TC. When the module vent MV is separated and scattered outward from the top cover TC as a result of breakage of the module vent MV, the module vent MV may collide with an external structure. Thus, the module vent MV is designed such that when the module vent MV is broken, the module vent MV may not be completely separated from the top cover TC owing to the hinge portions H without hindering the breakage of the module vent MV.

That is, as the center line CL is broken, the module vent MV may be opened toward both sides of the center line CL as being folded at the hinge portions H while maintaining connection with the top cover TC through the hinge portions H.

Both ends of the center line CL may be in contact with the border line PL, and intersection points BO between the center line CL and the border line PL may be break start points. That is, the intersection points BO formed at both ends of the center line CL may correspond to break start points, and break starting from both ends of the center line CL may propagate to the entirety of the break line BL except for the hinge portions H while propagating along the center line CL and the border line PL on both sides of the center line CL, thereby completely opening the module vent MV. That is, when the module vent MV is broken, the hinge portions H may remain in connection with the top cover TC without being broken.

Referring to FIG. 8, the thickness t1 of the hinge portions H may preferably be greater than the thickness t2 of the center line CL. Owing to this, when the module vent MV is broken starting from the center line CL, the hinge portions H may remain in connection with the top cover TC without being broken.

More specifically, it may be designed that the thickness t1 of the hinge portions H is 70% or less of the thickness t0 of the top cover TC. When the thickness t1 of the hinge portions H is greater than 70% of the thickness t0 of the top cover TC, the hinge portions H may not be easily folded, and thus the module vent MV may not be easily opened.

It may be designed that the thickness of the break line BL such as the thickness t2 of the center line CL other than the thickness t1 of the hinge portions H is 30% or less of the thickness t0 of the top cover TC. When the thickness t2 of the center line CL is greater than 30% of the thickness t0 of the top cover TC, it may be difficult to start breaking at the center line CL. The thickness of the break line BL may be varied depending on a set operating pressure of the module vent MV, and may be designed to facilitate the folding operation of the hinge portions H and the break of the center line CL.

In the present disclosure, the guide ribs GR may be designed to concentrate the pressure of gas discharged from the cell vent V on the center position of the module vent MV, and the break line BL of the module vent MV may be designed to start breakage at the center position of the module vent MV, thereby guaranteeing rapid breakage of the module vent MV. When the breakage of the module vent MV does not occur rapidly but occurs slowly in a dangerous situation such as overheating, gas discharged from the cell vent V may not be discharged to the outside but may be trapped inside the top cover TC, and thus other battery cells B or circuit devices may deteriorate.

The module vents MV may be provided such that the module vents MV may respectively correspond to the cell vents V of the battery cells B. That is, the module vents MV may be formed on the top cover TC extending across the battery cells B at positions respectively corresponding to the cell vents V of the battery cells B, and gas discharged from the cell vents V may be discharged to the outside of the battery pack through the module vents MV respectively corresponding to the cell vents V instead of being discharged to the outside of the battery pack through a discharge path crossing the battery cells B to collect gas discharged from the cell vents V or a single vent formed at a particular position of the top cover TC. Owing to this structure, when some of the battery cells B are locally overheated, high-temperature, high-pressure gas discharged from the cell vents V of the overheated battery cells B may be rapidly discharged through the shortest paths in a vertical direction without deteriorating other battery cells B while crossing the other battery cells B.

Figure 9:
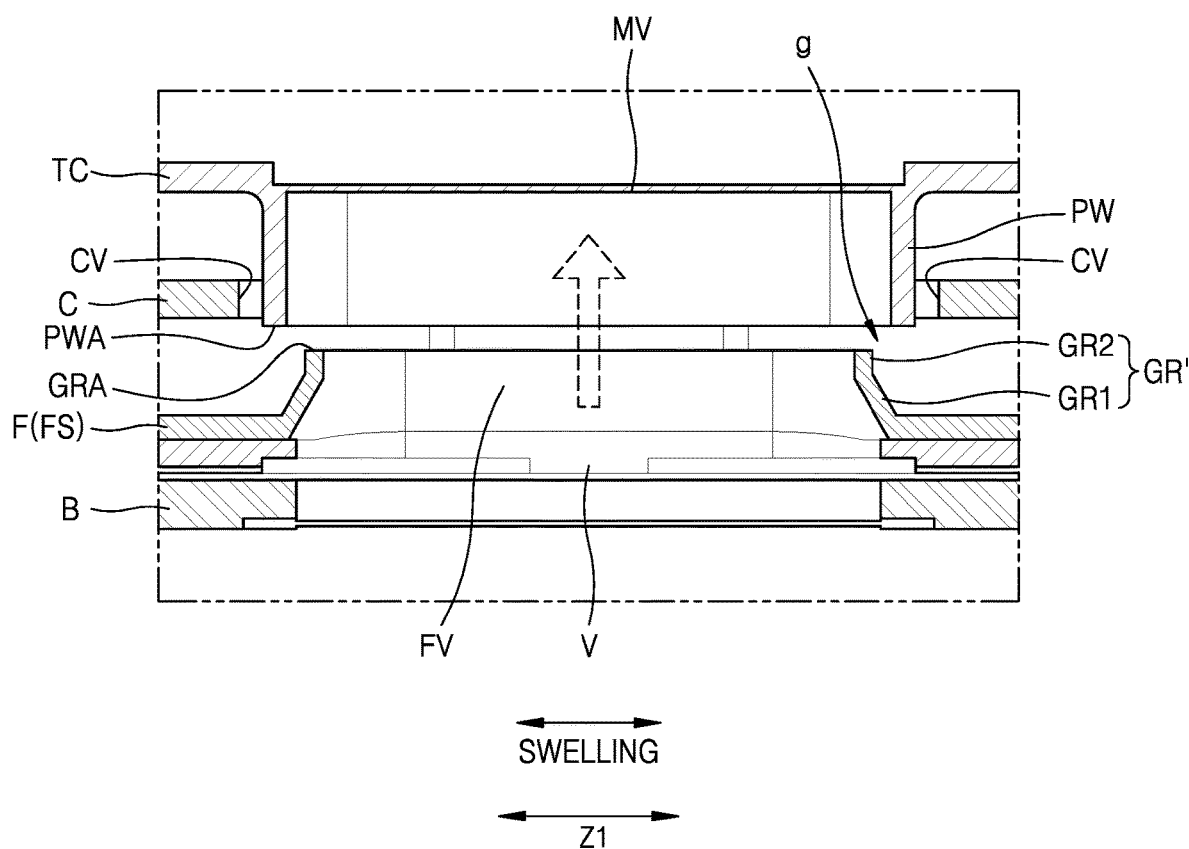
FIG. 9 is a view illustrating a modification of the guide ribs shown in FIG. 5, according to another embodiment.

FIG. 9 is a view illustrating a modification of the guide ribs GR shown in FIG. 5, according to another embodiment.

Referring to the drawing, guide ribs GR' and the protruding barrier wall PW protrude in mutually-facing directions from the main bodies of the frames F (or the support portions FS of the frames F) and the main body of the top cover TC. The guide ribs GR' are formed at inner positions relatively close to the center of the cell vent V, and the protruding barrier wall PW are formed at an outer position relatively distant from the center of the cell vent V. In addition, a clearance gap (g) may be formed between leading ends GRA of the guide ribs GR' and the leading end PWA of the protruding barrier wall PW as a measure for the swelling of the battery cell B.

In the present embodiment, the guide ribs GR' may include: inclined portions GR1 formed in a shape converging toward the center of the cell vent V; and extension portions GR2 bent from the inclined portions GR1 and extending in parallel with the protruding barrier wall PW. The inclined portions GR1 may have a cross-sectional shape gradually decreasing in an upward direction of a discharge path, and the extension portions GR2 may have a uniform cross-sectional shape and may extend in parallel with each other in the upward direction of the discharge path. That is, the extension portions GR2 may extend in a uniform cross-sectional shape corresponding to the minimum cross-section of the inclined portions GR1 and may form the leading ends GRA of the guide ribs GR'. The extension portions GR2 may be fluidly connected to the protruding barrier wall PW.

The present disclosure has been described with reference to the embodiments shown in the accompanying drawings for illustrative purposes only, and it will be understood by those of ordinary skill in the art that various modifications and equivalent other embodiments may be made therefrom. Therefore, the scope and spirit of the present disclosure should be defined by the following claims.

INDUSTRIAL APPLICABILITY

The present disclosure may be applied to battery packs which are rechargeable energy sources, and to various devices using battery packs as power sources.

The invention claimed is:

1. A battery pack comprising:
a plurality of battery cells, each comprising a cell vent;
frames arranged together with the plurality of battery cells in an arrangement direction and coupled together such that frames of each of pairs of adjacent frames face each other with a battery cell of the plurality of battery cells therebetween, each of the frames comprises a partial guide rib that, together with a partial guide rib of an adjacent frame, surrounds the cell vent of the battery cell between the frames;
a top cover arranged above the frames to cover the frames and comprising protruding barrier walls; and
a wiring board between the top cover and the frames, the wiring board having through-hole to provide a discharge path between the top cover and the frames,
wherein the guide ribs protrude from main bodies of the frames toward the top cover and are inclined to converge with a width gradually decreasing in a protruding direction of the guide ribs, and
wherein, when the battery cell swells, the guide ribs provided as a pair surrounding the cell vent of the battery cell are moved outward away from each other.

2. The battery pack of claim 1, wherein the guide ribs of the respective pair of adjacent frames form a discharge hole at a position corresponding to the cell vent of the battery cell.

3. The battery pack of claim 1, wherein the guide ribs of the respective pair of adjacent frames have an elliptical shape corresponding to the cell vent of the battery cell.

4. The battery pack of claim 1, wherein, as the frames arranged in the arrangement direction at front and rear sides of the battery cell with the battery cell therebetween are coupled to each other, the guide ribs of the respective pair of adjacent frames entirely surround the cell vent of the battery cell.

5. The battery pack of claim 1, wherein the guide ribs of the respective pair of adjacent frames and the protruding barrier wall corresponding thereto protrude in mutually-facing directions from main bodies of the pair of adjacent frames and a main body of the top cover.

6. The battery pack of claim 5, wherein the guide ribs of the respective pair of adjacent frames and the protruding barrier wall corresponding thereto form the discharge path of tunnel-type with the through-hole of the wiring board interposed therebetween.

7. The battery pack of claim 1, wherein the guide ribs are inclined to have a cross-section gradually decreasing in the protruding direction of the guide ribs.

8. The battery pack of claim 1, wherein the protruding barrier walls protrude from a main body of the top cover toward the frames in a parallel form to have a width which is substantially uniform in the protruding direction of the protruding barrier walls.

9. The battery pack of claim 1, wherein a module vent is formed on the top cover at a position corresponding to the cell vent of the battery cell.

10. The battery pack of claim 9, wherein the module vent comprises a break line formed by recessing a portion of an upper or lower surface of the top cover in a thickness direction of the top cover.

11. The battery pack of claim 10, wherein the break line comprises:
    a border line formed in a closed loop along a border of the module vent; and
    a center line formed to cross the border line.

12. The battery pack of claim 11, wherein the center line extends in a direction crossing the module vent at a center position of the module vent.

13. The battery pack of claim 11, wherein hinge portions are formed on both lateral portions of the border line which face the center line.

14. The battery pack of claim 13, wherein the hinge portions have a thickness greater than a thickness of the center line.

15. The battery pack of claim 13, wherein the module vent is opened toward both sides of the center line while being broken along the center line and folded at the hinge portions.

16. The battery pack of claim 9, wherein the module vent comprises a plurality of module vents respectively corresponding to the cell vents of the plurality of battery cells.

* * * * *